United States Patent
Hong et al.

(10) Patent No.: US 8,349,197 B2
(45) Date of Patent: *Jan. 8, 2013

(54) METHOD FOR MANUFACTURING A PERPENDICULAR MAGNETIC WRITE HEAD HAVING A TAPERED WRITE POLE AND NON-MAGNETIC BUMP STRUCTURE

(75) Inventors: Liubo Hong, San Jose, CA (US); Wen-Chien D. Hsiao, San Jose, CA (US); Yimin Hsu, Sunnyvale, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 651 days.

This patent is subject to a terminal disclaimer.

(21) Appl. No.: 12/623,206

(22) Filed: Nov. 20, 2009

(65) Prior Publication Data

US 2011/0120878 A1   May 26, 2011

(51) Int. Cl.
*B44C 1/22* (2006.01)
(52) U.S. Cl. ... 216/22; 29/603.16; 205/205; 204/192.34
(58) Field of Classification Search ............... None
See application file for complete search history.

(56) References Cited

U.S. PATENT DOCUMENTS

| | | | | |
|---|---|---|---|---|
| 7,181,829 B2 * | 2/2007 | Takahashi et al. | ......... | 29/603.15 |
| 7,199,973 B2 * | 4/2007 | Lille | ......... | 360/123.09 |
| 7,343,668 B2 * | 3/2008 | Kobayashi | ......... | 29/603.16 |
| 8,252,190 B2 | 8/2012 | Pentek | | |
| 2006/0002021 A1 * | 1/2006 | Li et al. | ......... | 360/126 |
| 2008/0218908 A1 | 9/2008 | Yazawa et al. | ......... | 360/313 |
| 2008/0239568 A1 | 10/2008 | Miyatake et al. | ......... | 360/119.03 |
| 2008/0266710 A1 | 10/2008 | Kameda et al. | ......... | 360/125.03 |
| 2008/0278852 A1 * | 11/2008 | Kim et al. | ......... | 360/119.02 |
| 2008/0304179 A1 | 12/2008 | Miyatake et al. | ......... | 360/123.02 |
| 2008/0316653 A1 | 12/2008 | Sasaki et al. | ......... | 360/319 |
| 2009/0103211 A1 | 4/2009 | Chen et al. | ......... | 360/125.03 |
| 2009/0116145 A1 | 5/2009 | Guan et al. | ......... | 360/125.02 |
| 2009/0141406 A1 | 6/2009 | Sasaki et al. | ......... | 360/319 |
| 2009/0144966 A1 | 6/2009 | Zheng | ......... | 29/603.18 |
| 2009/0162699 A1 | 6/2009 | Sasaki et al. | ......... | 428/812 |

OTHER PUBLICATIONS

Non-Final Office Action Summary from U.S. Appl. No. 12/343,720 dated Nov. 23, 2011.
Notice of Allowance and Fee(s) Due from U.S. Appl. No. 12/343,720 mailed May 11, 2012.
Guan et al., "A Trailing Shield Perpendicular Writer Design With Tapered Write Gap for High Density Recording" IEEE Transactions on Magnetics, vol. 44, No. 11, Nov. 2008.

* cited by examiner

*Primary Examiner* — Binh X Tran
*Assistant Examiner* — David Cathey, Jr.
(74) *Attorney, Agent, or Firm* — Zilka-Kotab, PC

(57) ABSTRACT

A method for manufacturing a magnetic write head having a write pole and a trailing wrap around magnetic shield, and having a non-magnetic step layer and a non-magnetic bump to provide additional spacing between the write pole and the trailing wrap around shield at a location removed from the air bearing surface. A magnetic write pole material is deposited on a substrate and a non-magnetic step layer is deposited over the write pole. A reactive ion milling can he used to pattern the non-magnetic step layer to have a front edge that is located a desired distance from an air hearing surface. A patterning and ion milling process is then performed to define a write pole, and then a layer of alumina is deposited and ion milled to from a tapered, non-magnetic bump at the front the non-magnetic step layer.

23 Claims, 21 Drawing Sheets

METHOD FOR MANUFACTURING A PERPENDICULAR MAGNETIC WRITE HEAD HAVING A TAPERED WRITE POLE AND NON-MAGNETIC BUMP STRUCTURE

RELATED APPLICATIONS

The present application is related to commonly assigned U.S. patent application Ser. No. 12/343,720, entitled METHOD FOR MANUFACTURING A MAGNETIC WRITE HEAD HAVING A HARD MASK DEFINED WRITE POLE TRAILING EDGE STEP, filed on Dec. 24, 2008 now U.S. Pat. No. 8,252,190 B2, which is incorporated herein by reference.

FIELD OF THE INVENTION

The present invention relates to perpendicular magnetic recording and more particularly to a magnetic write head having a write pole with a non-magnetic step layer that provides additional spacing between the trailing magnetic shield and the write pole, and non-magnetic bump layer formed at the front edge of the non-magnetic step layer.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed, for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soil underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head that has a non-magnetic step layer formed over a write pole to provide additional spacing between the write pole and the trailing shield. The write head also has a tapered non-magnetic bump layer formed adjacent to a front edge of the step layer to provide additional spacing between the write pole and the trailing shield.

The method includes providing a substrate and depositing a write pole material over the substrate. A RIE stop layer is then deposited over the write pole material and a non-magnetic step layer is formed over the RIE stop layer, the non-magnetic step layer having a front edge that is located a desired distance from an air bearing surface plane. A series of thin layers is formed over the write pole and non-magnetic step layer, the series of thin layers including at least one hard mask layer and an endpoint detection layer. A layer of alumina is deposited over the series of thin layers and a mask structure is formed over the series of thin layers, the mask structure being configured to define a write pole shape. A first ion milling is performed to remove portions of the series of thin layers and magnetic write pole material that are not protected by the mask structure. Then, after performing the first ion milling, a layer of alumina is deposited and is then ion milled to preferentially remove horizontally disposed portions of the alumina layer leaving a tapered alumina bump adjacent to the front edge of the non-magnetic step layer and alumina side walls at the sides of the magnetic write pole material.

The series of thin layers can also include an end point detection layer, and the second ion milling can be terminated when the end point detection layer has been detected. In another embodiment the second ion milling can be continued to remove a portion of the write pole material to form a tapered trailing edge on the write pole.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
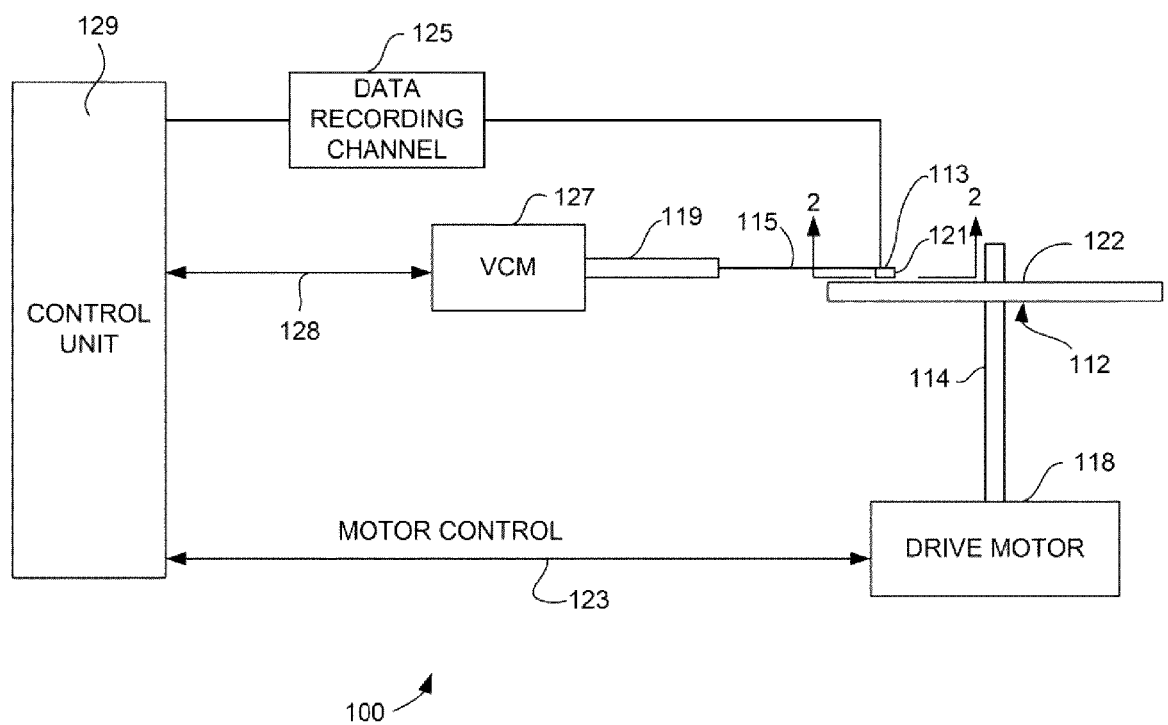
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the diskstorage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
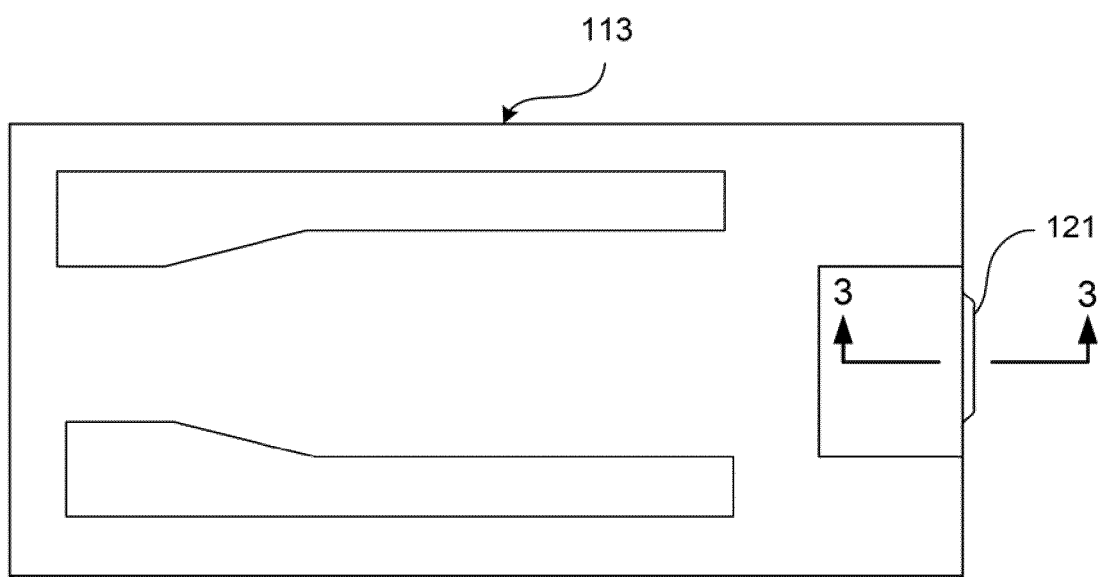
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3A:
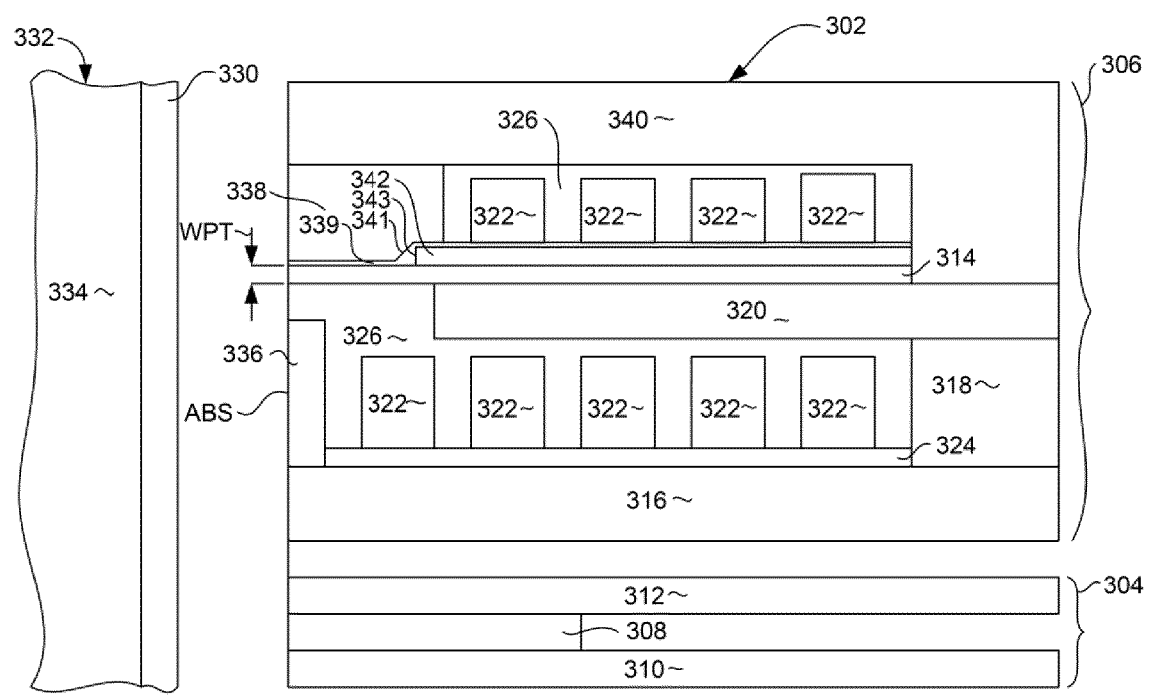
FIG. 3A is a cross sectional view of a magnetic head, taken from line 3-3 of FIG. 2 and rotated 90 degrees counterclockwise, of a magnetic head according to an embodiment of the present invention.

With reference now to FIG. 3A, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3A) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

Figure 3B:
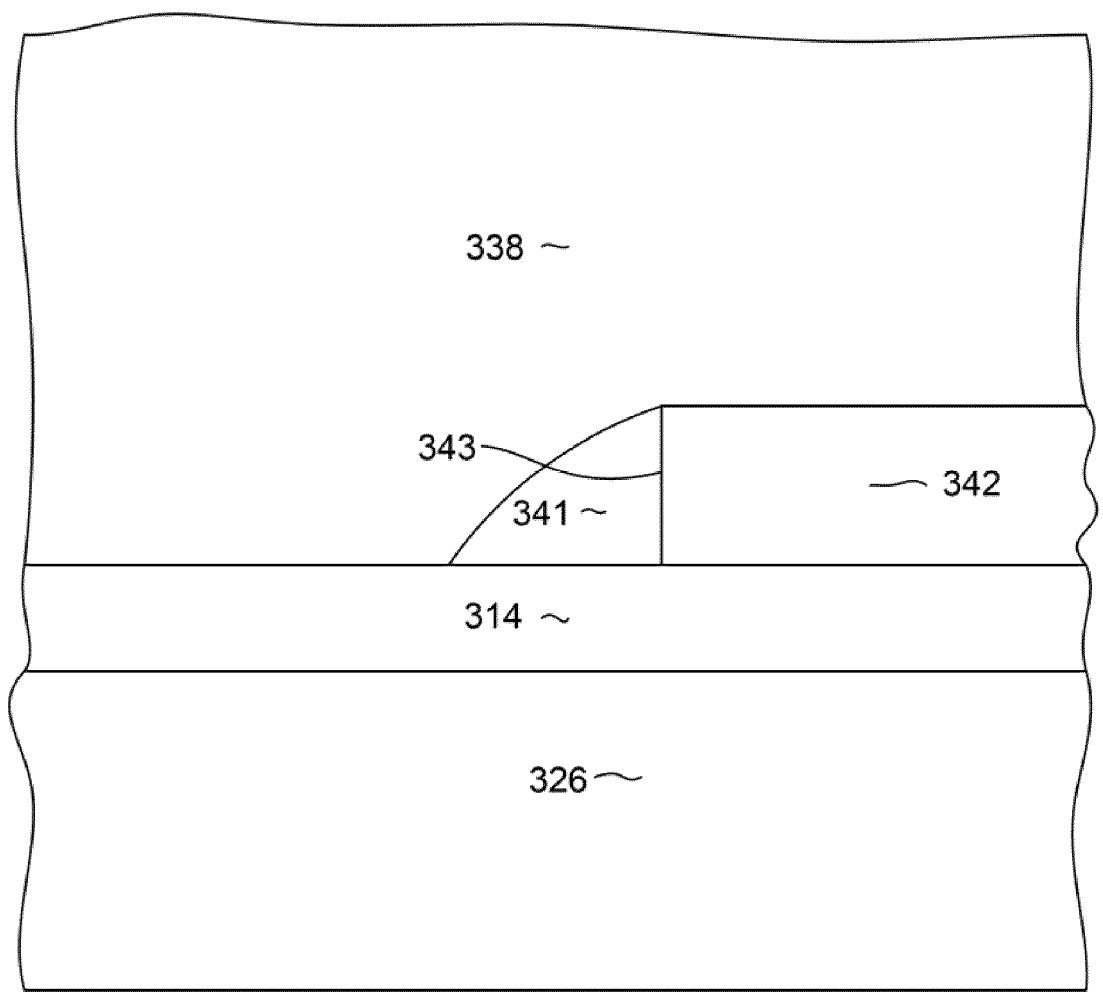
FIG. 3B is an enlarged view of a portion of the magnetic head of FIG. 3A.
Figure 4:
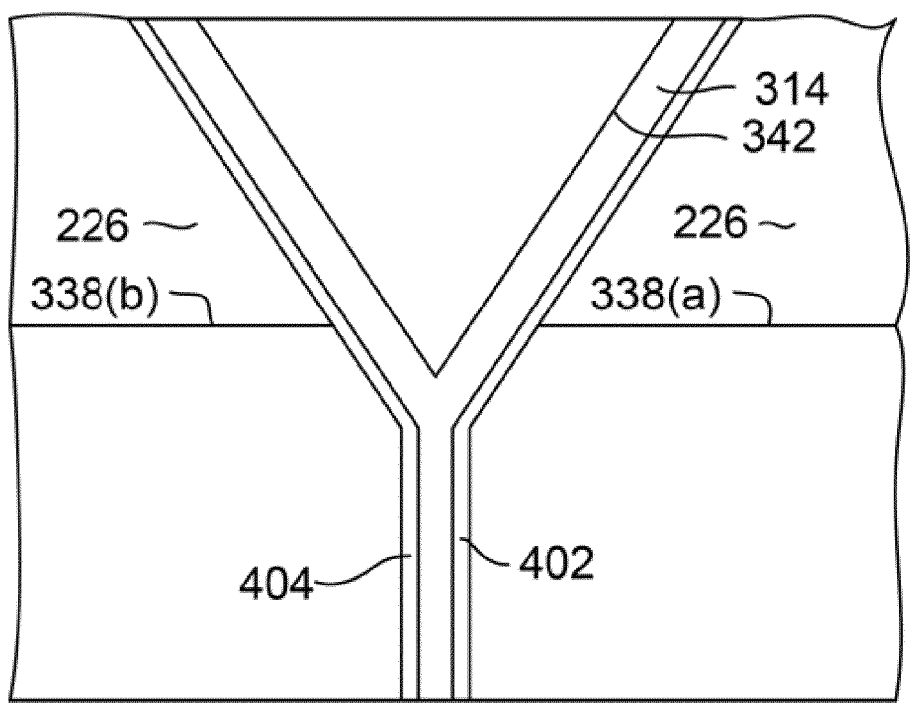
FIG. 4 is a top down view of a write pole of the magnetic head.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The shield 338 also has side shielding portions 338(a) and 338(b) that are separated from sides of the write pole by non-magnetic side gap layers 402, 404, which can be seen in the top down view of FIG. 4. The side portions of the shield 338 and side gap portions are not shown in FIG. 3, but will be described in greater detail herein below. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

The construction of the trailing shield 338 involves a tradeoff between increasing field gradient and minimizing the leakage of magnetic write field from the write pole 314 to the trailing shield. In order to maximize the field gradient, magnetic saturation of the trailing shield 338 should be minimized, and the spacing between the shield 338 and write pole 314 should be minimized. On the other hand, in order to prevent the loss of magnetic write field, a certain minimum amount of spacing between the write pole 314 and shield 338 must be maintained.

In order to achieve an optimal balance between field gradient and write field strength, the write pole 314 has a non-magnetic step 342 that provides additional spacing between the write pole 314 and the trailing shield 338 at a location that is somewhat removed from the air bearing surface. The step 342 (which can be seen more clearly in FIG. 3B) has a front edge 343, and a non-magnetic bump layer 341 is formed at this front edge of the step 342. The location of the front edge of the trailing edge step 342 is preferably behind the flare point. This can be seen more clearly with reference to FIG. 4, which shows a top down view of the write pole 314 and non-magnetic step 342. The step layer 342 can be constructed of a RIEable material (i.e. a material that is capable of being removed by reactive ion etching) such as SiC, Ta, TaO, Ta$_2$O$_5$, SiO$_2$, SiN, SiO$_x$N$_y$, etc. The bump layer 341 can be constructed of a material such as alumina (Al$_2$O$_3$). Further details of the non-magnetic step 342 and non-magnetic bump 341 will described below along with a description of a method of manufacturing a magnetic write head according to an embodiment of the invention.

Figure 5:
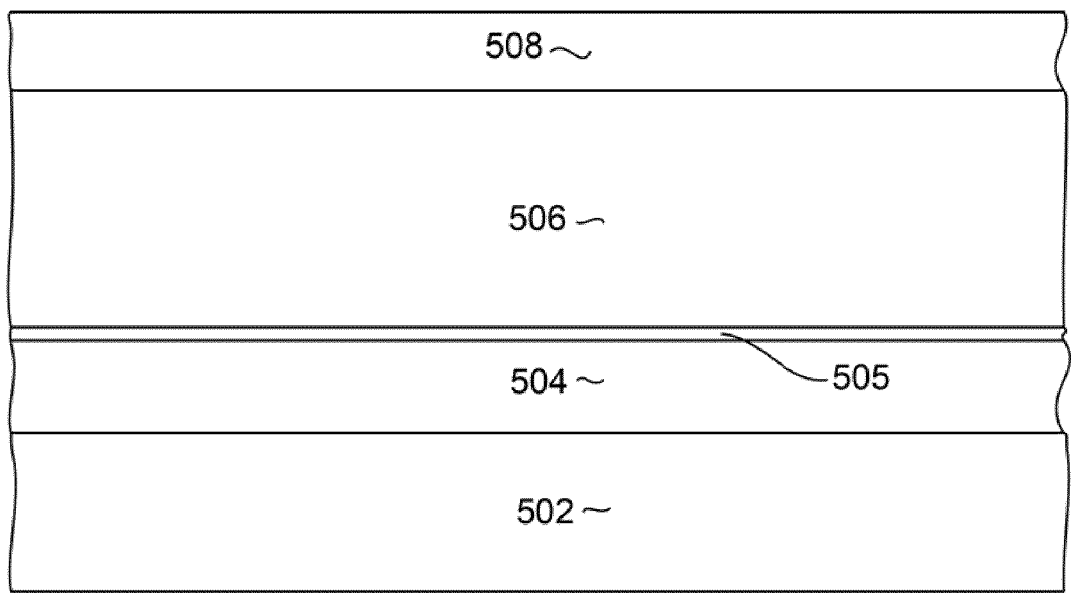
FIGS. 5-17 show a portion of a write head in various intermediate stages of manufacture illustrating a method tier manufacturing a write head according to an embodiment of the invention.

FIGS. 5-15 illustrate a method for manufacturing a magnetic write pole having a non-magnetic step and tapered non-magnetic bump according to an embodiment of the invention. With particular reference to FIG. 5, a substrate 502 is provided. The substrate 502 can include the insulating fill layer 326 and all or a portion of the shaping layer 320 described above with reference to FIG. 3A. A magnetic write pole material layer 504 is deposited over the substrate. The write pole material layer 504 can be a lamination of layers of high magnetic moment material such as CoFe separated by thin non-magnetic layers. This lamination of layers helps to reduce magnetic domain formation and increases switching speed. A RIE stop layer 505 is deposited over the top of the magnetic write pole material 504. The RIE stop layer 505 can be a non-magnetic material that is deposited sufficiently thin that it can act as one of the thin, non-magnetic layers (not shown) within the magnetic write pole lamination 504. For example, the RIE stop layer 505 can be Ni or NiCr and can have a thickness of 2 nm to 30 nm.

With continued reference to FIG. 5, a RIEable, non-magnetic layer 506 is deposited over the end point detection layer 505. The RIEable, non-magnetic layer provides the non-magnetic step 342 described above with reference to FIGS. 3A and 3B, and therefore, is deposited to a thickness of 30 to 800 nm to provide a desired non-magnetic step thickness. The RIEable, non-magnetic layer 506 (which will be referred to hereafter as non-magnetic step layer 506) can be constructed of a material such as SiC, Ta, TaO, Ta$_2$O$_5$, SiO$_2$, SiN, SiO$_x$N$_y$. Then, a layer of resist material 508 is deposited over the RIEable non-magnetic layer 506.

Figure 6:
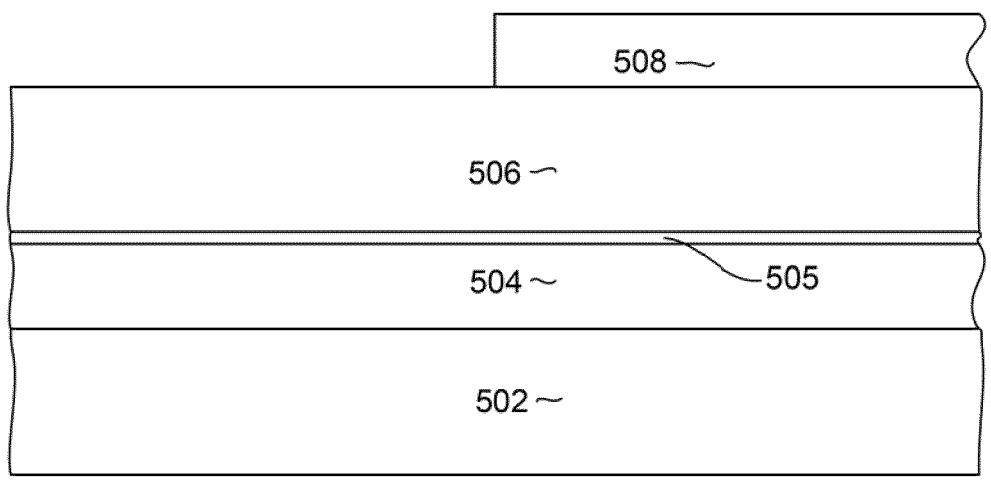
Figure 7:
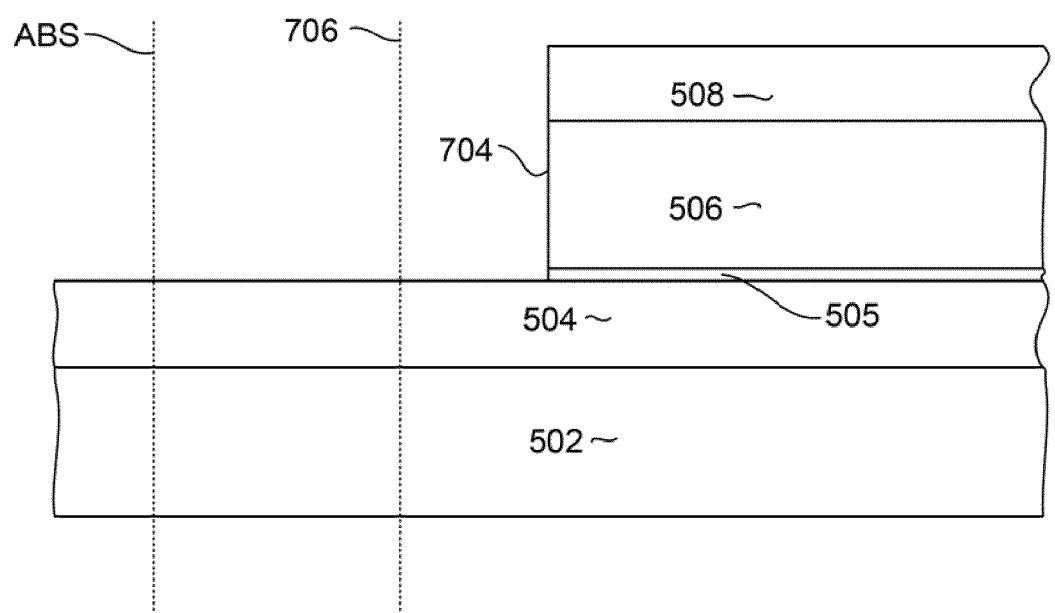

With reference now to FIG. 6 the photoresist layer 508 is photolithographically patterned to form a mask that is shaped to define a non-magnetic step layer shape. Then, a reactive ion etching (RIE) is performed to remove portions of the RIEable non-magnetic layer 506 that are not protected by the mask 508, leaving a structure as shown in FIG. 7. The mask 508 can then be lifted off by a process such as a chemical lift off process. As can be seen, the step layer 506 has a front edge 704 that is located a desired distance from an intended air bearing surface plane (indicated by dashed line denoted ABS) and from an intended flare point location (indicated by dashed line 706).

Figure 8:
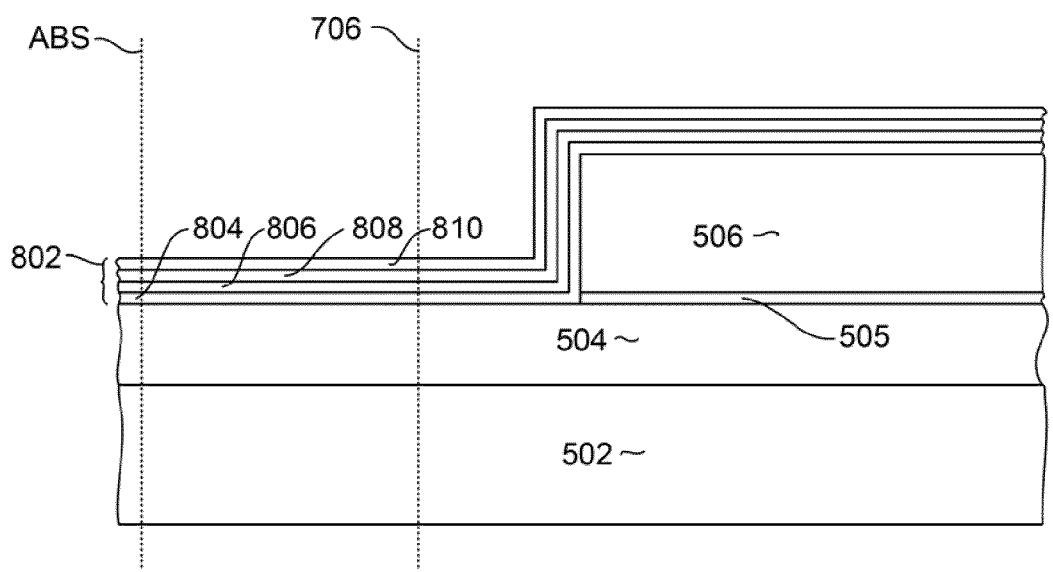

With reference now to FIG. 8, a series of layers 802 is deposited. The series of layers 802 can include a first layer 804, second layer 806, third layer 808 and fourth layer 810. The first layer 804 can be a layer that will function as a part of a non-magnetic trailing gap layer and can be a layer of alumina (Al$_2$O$_3$). The second layer 806 can be constructed of a hard mask material such as diamond like carbon (DLC) and can be deposited to a thickness of 10-30 nm. The third layer 808 can function as an end point detection layer. This layer 1108 can be thin, such as 2-5 nm, and can be constructed of a material that can be easily detected by an end point detection scheme such as Secondary Ion Mass Spectrometry (SIMS). For example, the end point detection layer 808 can be constructed of Ni, NiCr, Ta, Rh. The fourth layer 810 can be a second hard mask layer such as alumina. This layer can be deposited to a thickness of 10-40 nm.

Figure 9:
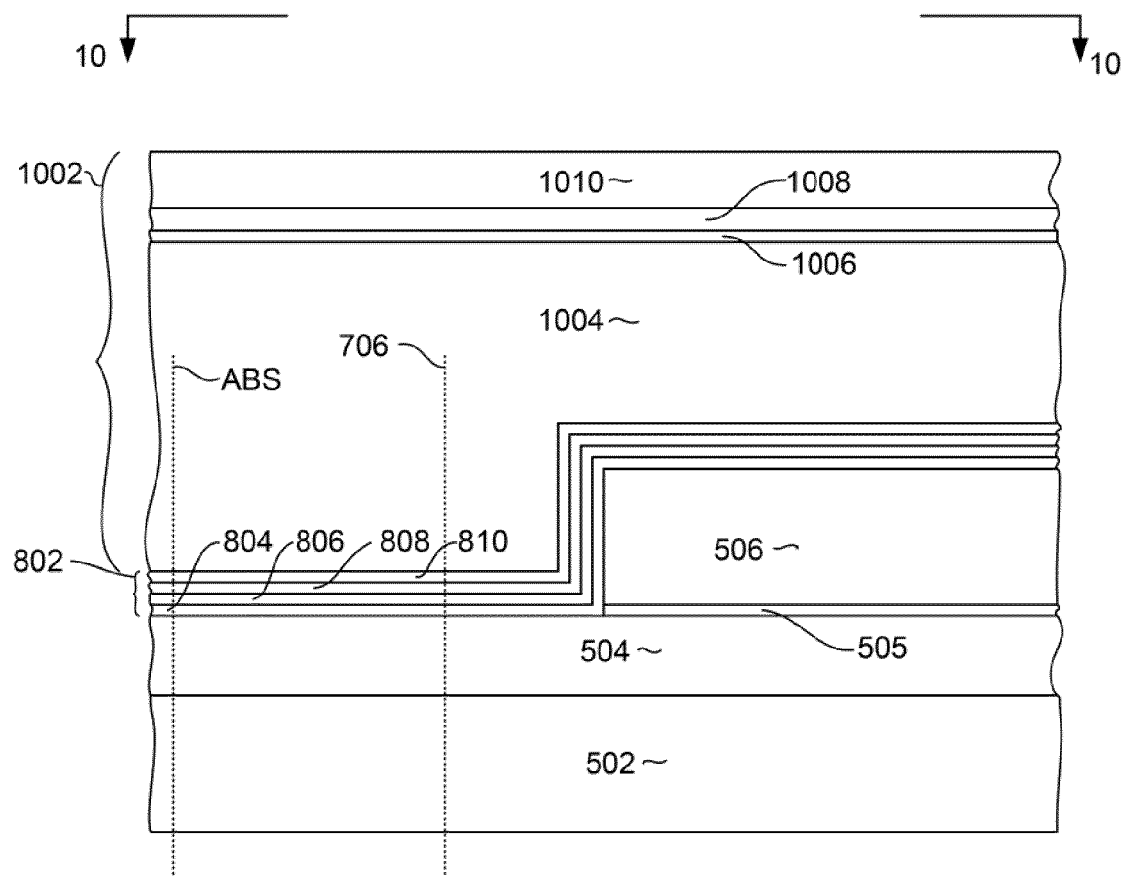
Figure 10:
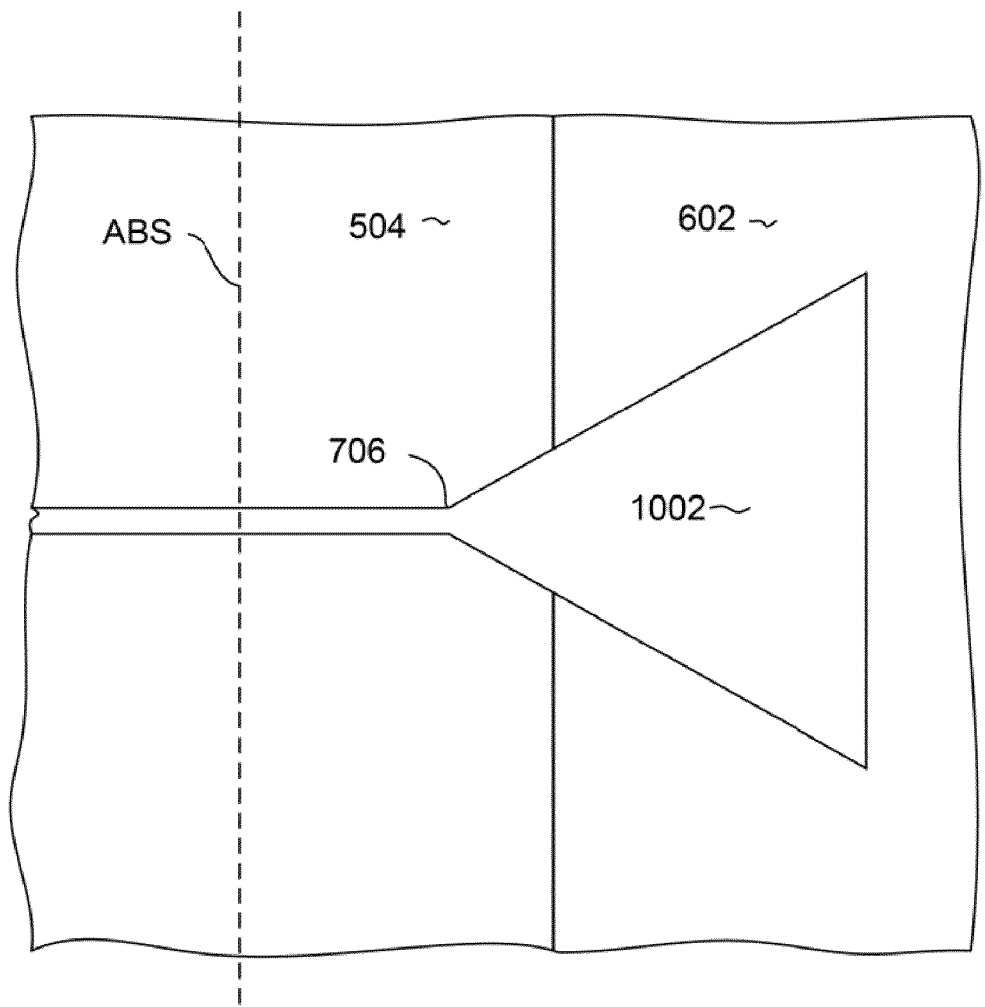

With reference now to FIG. 9, a series of mask layers 1002 are formed over the layers 802. The mask layers 1002 can include an image transfer layer 1004, which can be constructed of a soluble polyimide material such as DURAMIDE®. This layer 1004 can be constructed somewhat thick. A hard mask layer 1006 such as SiO$_2$ can he deposited over the image transfer layer 1004. A bottom antireflective coating (BARC) layer 1008 can be deposited over the second hard mask. This BARC layer 1008 can be constructed of the same material as the image transfer layer 1004 (e.g. DURA-MIDE®). Finally, a photoresist layer 1010 can be deposited over the BARC layer 1208.

The photoresist layer 1010 is photolithographically patterned to a desired write pole shape, and the image of this patterned resist layer 1010 is then transferred onto the underlying layers 1004, 1006, 1008 by a material removal process that may include one or more of ion milling or reactive ion etching. The pattern of the resulting mask structure can be seen more clearly with reference to FIG. 10, which shows a top-down view as taken from line 10-10 of FIG. 9. As can be seen, the mask 1002 defines a flare point at location 706.

Figure 11:
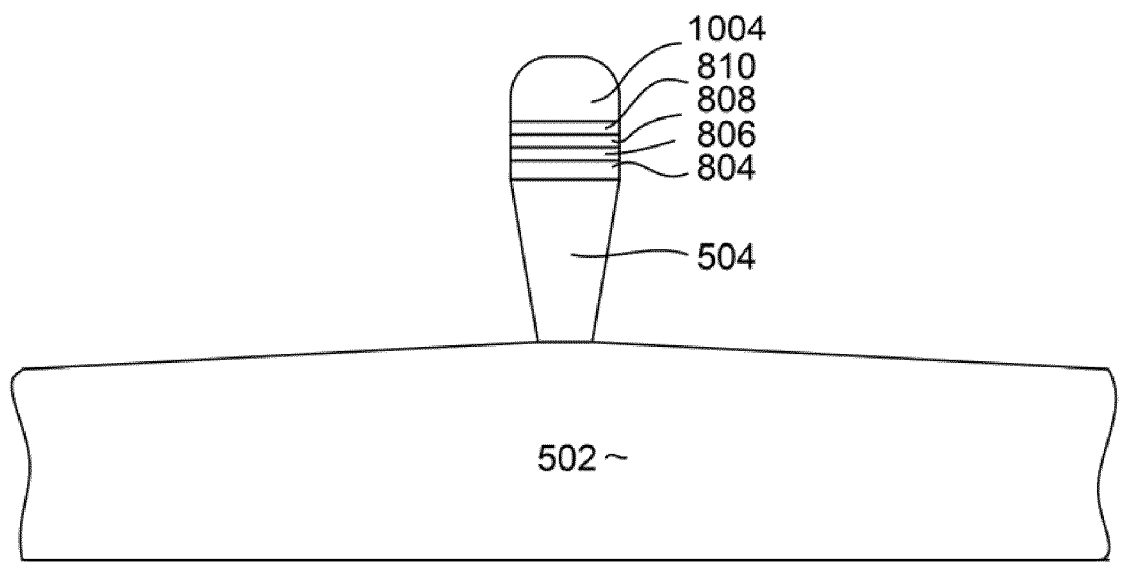
Figure 12:
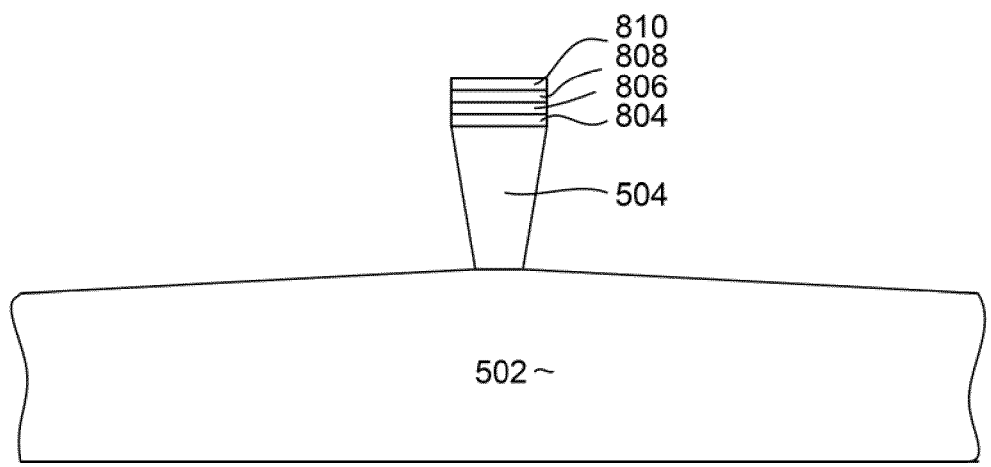

An ion milling can then be performed to remove portions of the layers 804, 806, 808, 810 and magnetic write pole layer 504 that are not protected by the mask structure 1002 to form a write pole 504, which can be seen more clearly with reference to FIG. 11 which shows a cross sectional view of the pole tip portion of the write pole 504 viewing a plane that is parallel with the air bearing surface (ABS). As can be seen, the ion milling removes the photoresist 1010, BARC layer 1008, hard mask 1006 and a portion of the image transfer layer 1004 (described above with reference to FIG. 9), leaving the structure shown in FIG. 11. The ion milling can be a sweeping ion milling, performed at an angle relative to normal in order to form the write pole 504 with tapered sides as shown in FIG. 11. Then, the remaining image transfer layer 1004 can be removed, leaving the structure shown in FIG. 12.

Figure 13:
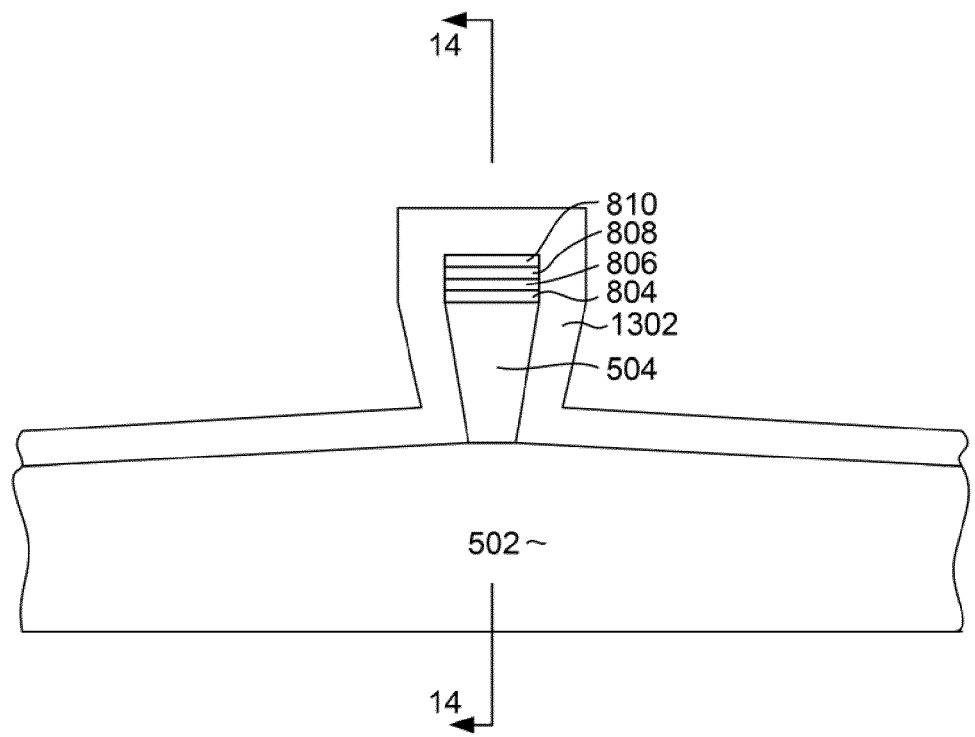
Figure 14:
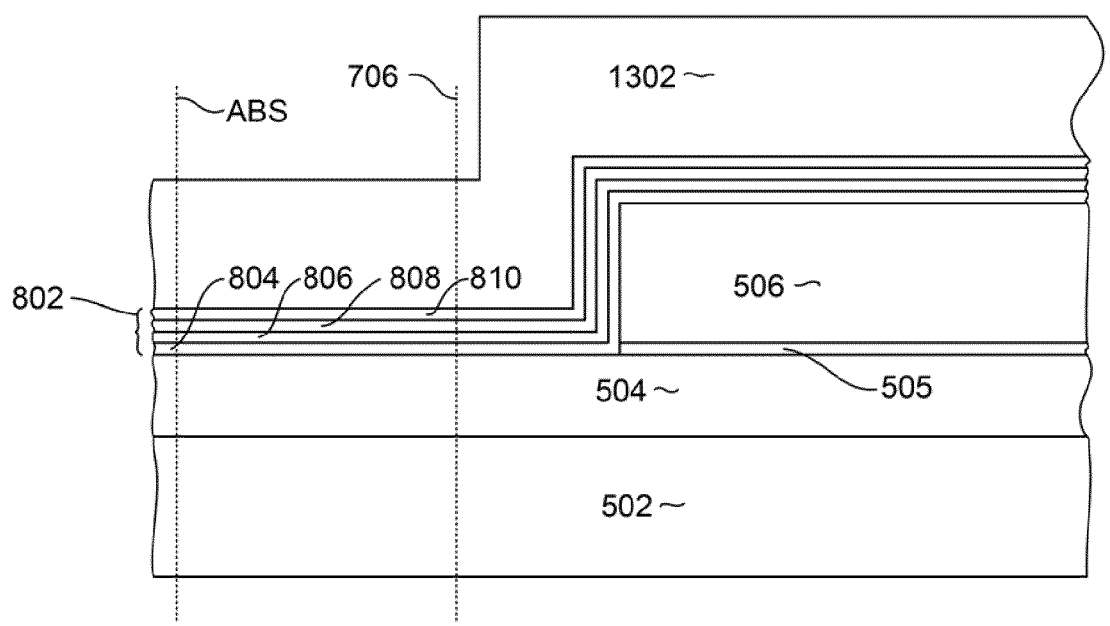

With reference now to FIG. 13 a layer of alumina 1302 is deposited by a conformal deposition process such as atomic layer deposition (ALD). This alumina layer can also be seen in FIG. 14, which shows a cross sectional view taken from line 14-14 of FIG. 13. Then, a directional material removal process such as ion milling is performed to preferentially remove horizontally disposed portions of the alumina layer 1302, thereby leaving alumina side walls 1302 as shown in FIG. 15.

Figure 15:
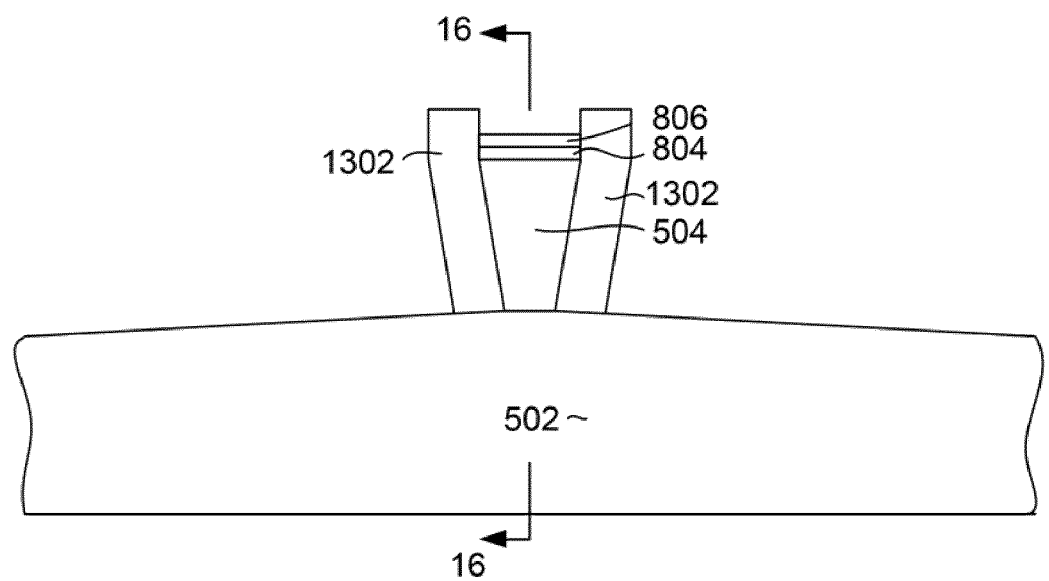
Figure 16:
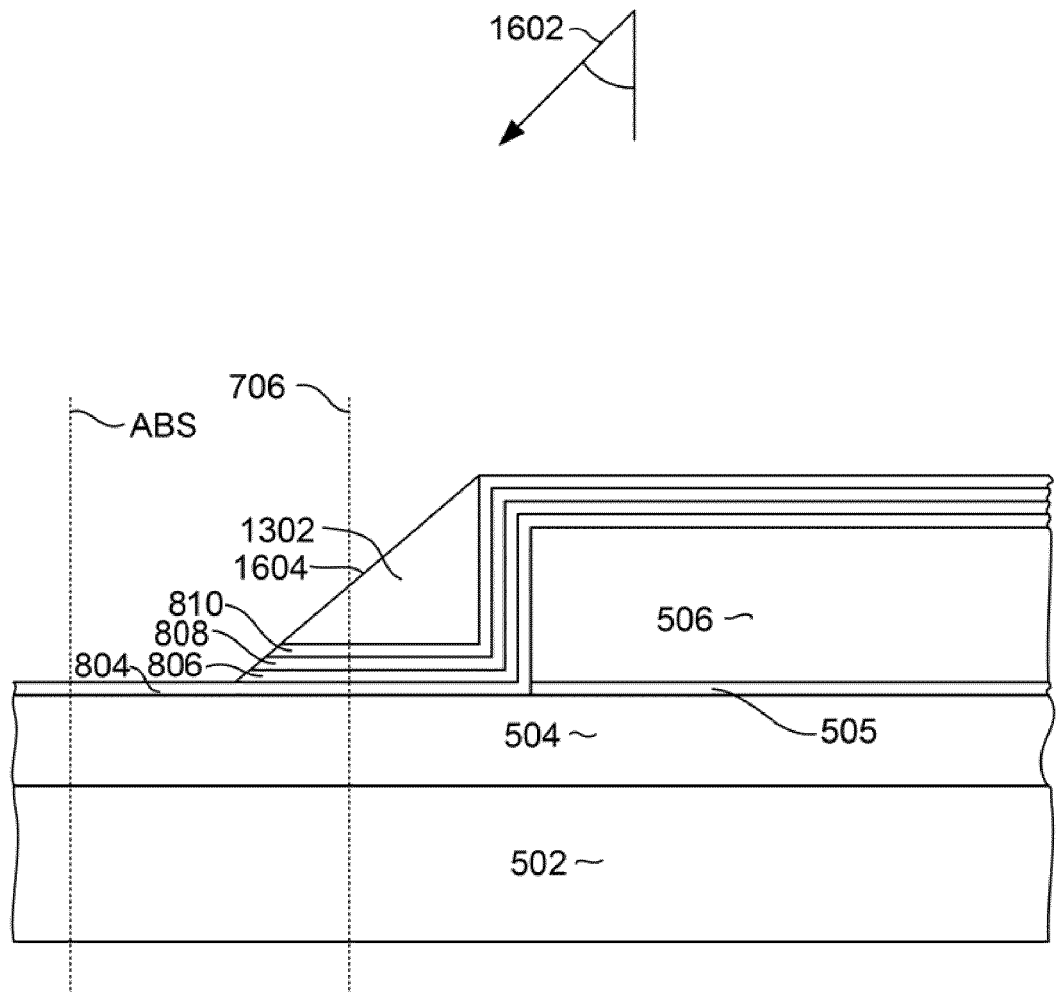

FIG. 16 is a cross sectional view taken from line 16-16 of FIG. 15. The ion milling described above, can be a sweeping ion milling, performed at an angle 1602 relative to normal. This angled sweeping ion milling results in a wedge of the remaining alumina 1302 being formed over the write pole 504. The wedge of alumina 1302 has a tapered surface 1604, which can be useful in forming a tapered leading edge on a trailing magnetic shield, as will be seen below. This angled ion milling can be performed until the end point detection layer 808 has been detected and removed. A follow-on RIE step removes the second mask layer 806, thereby leaving the alumina hard mask layer 804 in areas outside of the alumina wedge 1302. This remaining alumina hard mask 804 can provide a portion of a non-magnetic trailing gap layer for a trailing shield that has yet to be formed.

Figure 17:
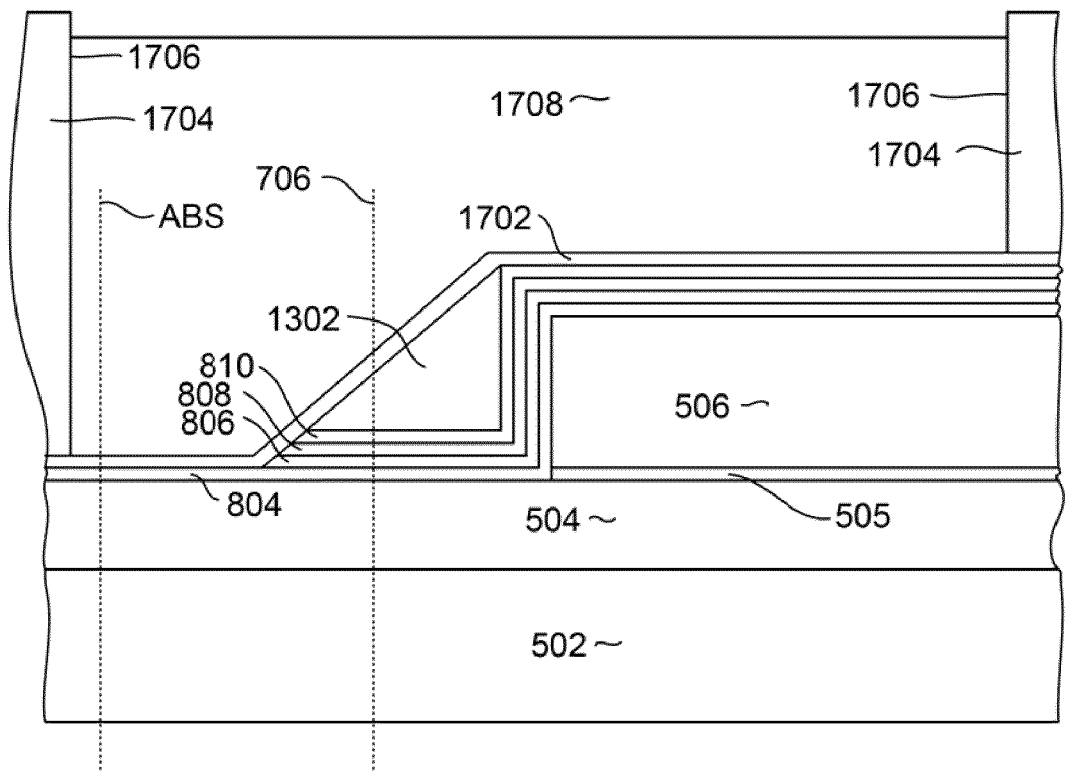

With reference now to FIG. 17, a seed layer 1702 is deposited. The seed layer 1702 can be an electrically conductive non-magnetic material such as Ru or Rh. Then, an electroplating frame mask such as a photoresist mask 1704 can be formed having an opening 1706 that is configured to define a trailing, wrap around magnetic shield. Then a magnetic material such as CoFe or NiFe can be electroplated into the opening 1706 in the mask 1704 to form a trailing, wrap-around magnetic shield 1708. The mask 1704 can then be lifted off, and a material removal process such as reactive ion beam etching, can be performed to remove unwanted remaining portions of the seed layer 1702.

The above described process forms a write head having a write pole 504 with a non-magnetic step 506 that can be accurately located relative to the flare point location 706 and also relative to the ABS. This method also forms a tapered non-magnetic bump 1302 at the front of the step 506 that allows the trailing magnetic shield 1708 to taper away from the write pole 504 at a region removed from the air bearing surface ABS. This configuration of the write pole 504 and shield 1708 provides optimal performance at very small bit sizes.

Figure 18:
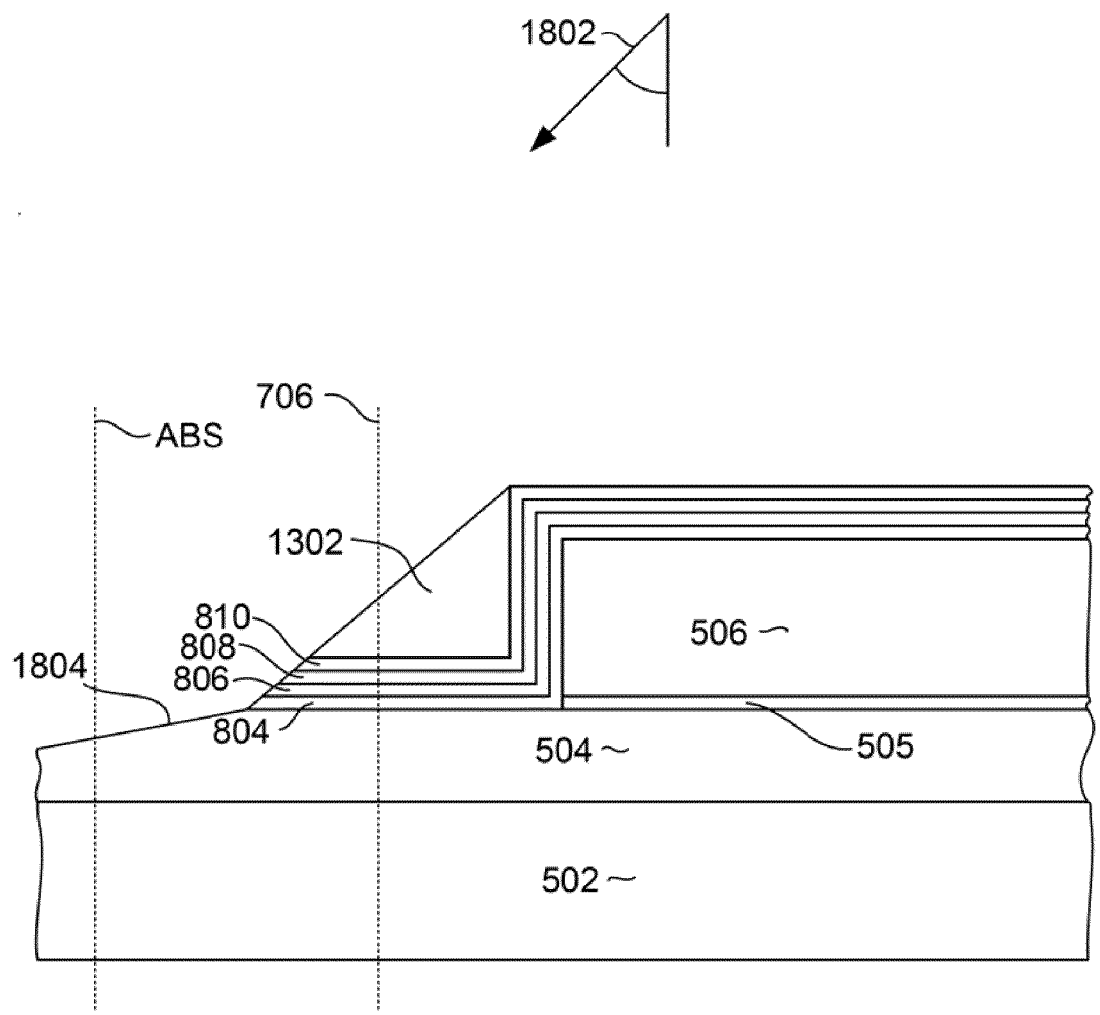
FIG. 18-20 show a portion of a write head in various intermediate stages of manufacture illustrating a method for manufacturing a write head according to an alternate embodiment of the invention.
Figure 19:
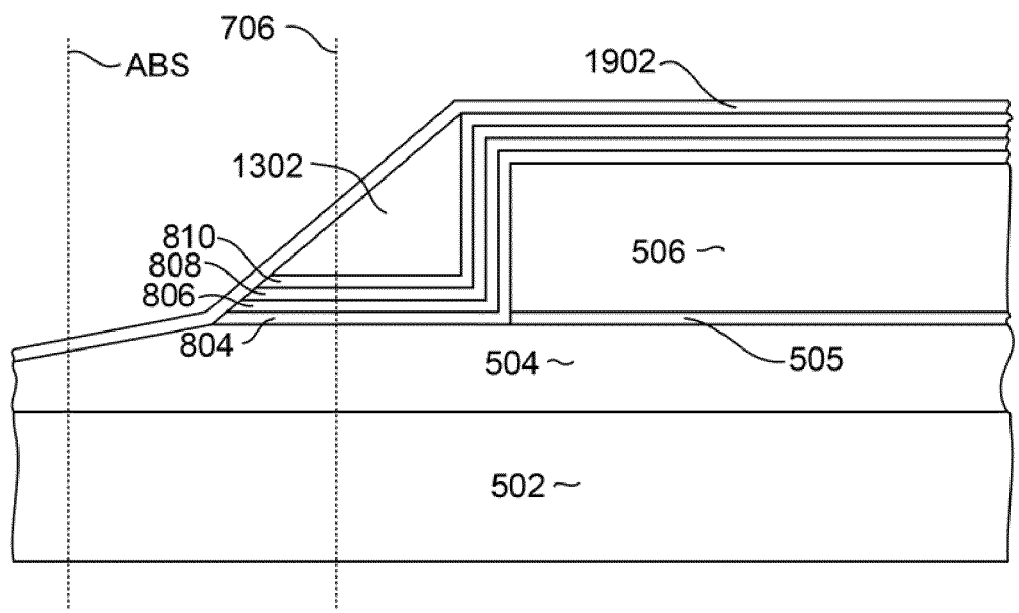
Figure 20:
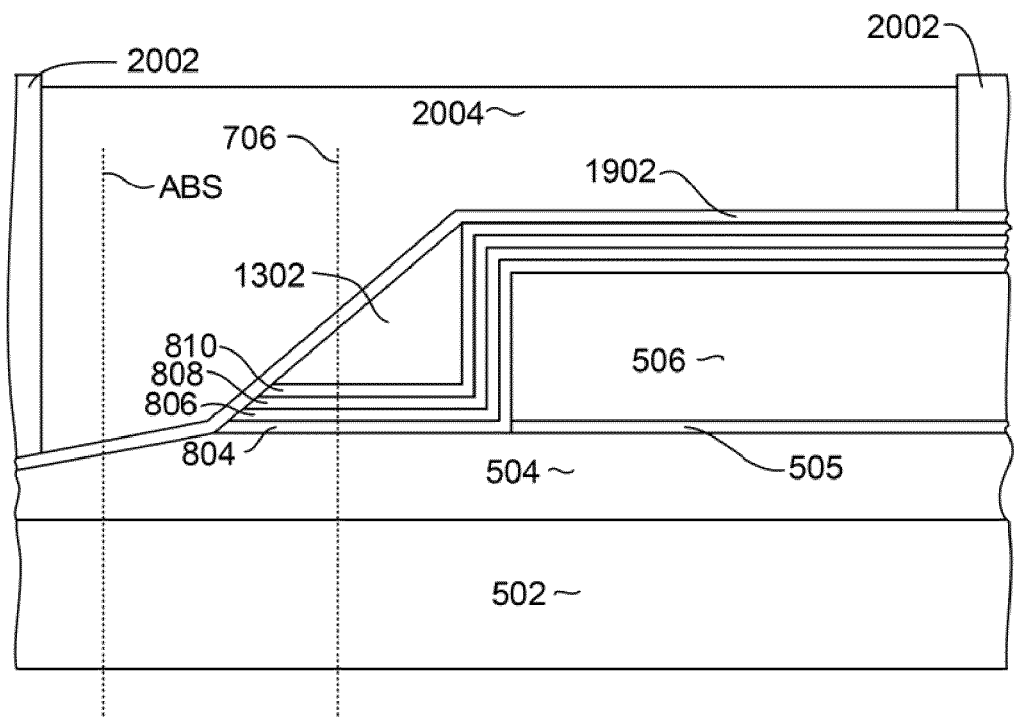

FIGS. 18-20 illustrate a method for manufacturing a magnetic write head according to an alternate embodiment of the invention. Starting with a structure as described above with reference to FIG. 16 (and before forming the shield 1708 of FIG. 17), a continued ion milling is performed to remove portions of the layer 804 that are not protected by the bump 1302 and to also remove a portion of the trailing edge of the write pole 504, resulting in a structure as shown in FIG. 18. This ion milling can be a continuation of the previously described ion milling that was used to form the tapered, non-magnetic bump 1302, or could be a separate ion milling. This ion milling is performed in such a manner and at such an angle 1802 that shadowing from the bump 1302 and step 506 causes the ion milling to form a tapered surface 1804 as shown in FIG. 18. Because the write pole 504 is protected everywhere beneath the bump 1302 and step 506, the taper initiates at the front edge of the bump 1302 and layers 804, 806, 808, 810. The tapered leading edge 1804 of the write pole 504 helps to focus magnetic flux to the tip of the magnetic write pole 504, thereby maximizing write field at very small bit lengths by minimizing the magnetic saturation of the write pole 504.

After the taper 1804 has been formed, a layer of non-magnetic material 1902 is deposited to such a thickness to define a trailing gap thickness. The non-magnetic material 1902 is preferably an electrically conductive material that can serve as an electroplating seed layer as well as a trailing gap layer. To this end, the layer 1902 can be constructed of a material such as Ru or Rh.

Then, with reference to FIG. 20, an electroplating frame mask 2002 can be formed and a magnetic material 2004 such as NiFe or CoFe can be electroplated into the opening in the mask 2002 to form a trailing magnetic shield 2004. As discussed above, the mask 2002 can be lifted off and a Material removal process such as reactive ion etching can be performed to remove portions of the layer 1902 that are not protected by the shield 2004.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a write pole material over the substrate;
   depositing a RIE stop layer over the write pole material;
   forming a non-magnetic step layer over the RIE stop layer, the non-magnetic step layer having a front edge that is located a desired distance from an air bearing surface plane;
   depositing a series of thin layers over the write pole material and the non-magnetic step layer, the series of thin layers including at least one hard mask layer and an endpoint detection layer;
   depositing a layer of alumina over the series of thin layers;

forming a mask structure over the series of thin layers, the mask structure being configured to define a write pole shape;

performing a first ion milling to remove portions of the series of thin layers and the magnetic write pole material that are not protected by the mask structure;

after performing the first ion milling, the depositing a layer of alumina; and performing a second ion milling to preferentially remove horizontally disposed portions of the alumina layer leaving a tapered alumina bump adjacent to the front edge of the non-magnetic step layer and leaving alumina side walls at sides of the magnetic write pole material.

2. The method as in claim 1 further comprising, after performing the second ion milling, depositing a non-magnetic, electrically conductive seed layer and electroplating a magnetic shield.

3. The method as in claim 1 wherein the series of thin layers comprises a first layer, a second layer formed over the first layer, a third layer formed over the second layer and a fourth layer formed over the third layer.

4. The method as in claim 3, wherein the first layer is a non-magnetic gap layer, the second layer is a first hard mask layer, the third layer is an end point detection layer and the fourth layer is a second hard mask layer.

5. The method as in claim 3 wherein the first and the fourth layers comprise alumina.

6. The method as in claim 1 wherein the first and the fourth layers comprise alumina and the second layer comprises diamond like carbon.

7. The method as in claim 3 wherein the first and the fourth layers comprise alumina and the third layer comprises Ni, NiCr, Ta or Ru.

8. The method as in claim 3 wherein the first layer comprises alumina, the second layer comprises diamond like carbon, the third layer comprises Ni, NiCr, Ta or Ru, and the fourth layer comprises alumina.

9. The method as in claim 3 wherein the first layer comprises alumina, the second layer comprises diamond like carbon and has a thickness of 10-30 nm, the third layer comprises Ni, NiCr, Ta or Ru and has a thickness of 2-5 nm, and the fourth layer comprises alumina and has a thickness of 10-40 nm.

10. The method as in claim 3 wherein the first layer comprises alumina and further comprising:

after performing the second ion milling, depositing a non-magnetic, electrically insulating seed layer, the non-magnetic, electrically insulating seed layer and the first layer being deposited to such thicknesses that their combined thicknesses define a desired trailing gap thickness; and forming a magnetic shield over the non-magnetic, electrically conductive seed layer.

11. The method as in claim 1 wherein the series of thin layers includes a hard mask layer and an end point detection layer formed above the hard mask layer, and wherein the second ion milling is terminated after reaching the end point detection layer.

12. The method as in claim 11 wherein the ion milling is terminated before the hard mask layer has been removed.

13. The method as in claim 1 further comprising performing a third ion milling sufficiently to remove a portion of the write pole material in an area that is not protected by the non-magnetic step layer or the tapered alumina bump.

14. The method as in claim 1 further comprising performing the second ion milling sufficiently to form a portion of the magnetic write pole layer that is not protected by the non-magnetic step or the tapered alumina bump in order to form a tapered surface on the magnetic write pole layer.

15. A method for manufacturing a magnetic write head, comprising:

providing a substrate;

depositing a write pole material over the substrate;

depositing a RIE stop layer over the write pole material;

depositing RIEable non-magnetic step layer over the RIE stop layer;

forming a photoresist mask over the RIEable non-magnetic step layer, the photoresist mask having a front edge that is located a desired distance from an air bearing surface plane;

performing a reactive ion etching to remove portions of the RIEable non-magnetic step layer that are not protected by the photoresist mask and terminating the reactive ion etching when an RIE stop layer has been reached, thereby forming a front edge on the RIEable non-magnetic step layer;

depositing a series of thin layers over the write pole and the RIEable non-magnetic step layer, the series of thin layers including at least one hard mask layer and an endpoint detection layer;

depositing a layer of alumina over the series of thin layers;

forming a mask structure over the series of thin layers, the mask structure being configured to define a write pole shape;

performing a first ion milling to remove portions of the series of thin layers and portions of the write pole material that are not protected by the mask structure;

after performing the first ion milling, depositing a layer of alumina;

performing a second ion milling to preferentially remove horizontally disposed portions of the alumina layer leaving a tapered alumina bump adjacent to the front edge of the non-magnetic step layer and leaving alumina side walls at sides of the magnetic write pole material;

performing a third ion milling, tapered using the alumina bump as a mask to remove a portion of the write pole material to form a tapered trailing edge on the write pole material.

16. The method as in claim 15 wherein the RIEable non-magnetic step layer comprises SiC, Ta, TaO, $Ta_2O_5$, $SiO_2$, SiN or $SiO_xN_y$.

17. The method as in claim 15 wherein the RIE stop layer comprises Ni or NiCr.

18. The method as in claim 15 wherein the RIE stop layer comprises Ni or NiCr and has a thickness of 2 to 30 nm.

19. The method as in claim 15 wherein the non-magnetic step layer comprises SiC, Ta, TaO, $Ta_2O_5$, $SiO_2$, SiN or $SiO_xN_y$.

20. The method as in claim 15 wherein the series of thin layer comprises a first layer of alumina, a layer of diamond like carbon formed over the first layer of alumina, an end point detection layer formed over the layer of diamond like carbon and a second layer of alumina formed over the end point detection layer.

21. The method as in claim 15 wherein the tapered trailing edge extends from the tapered alumina bump at least to the air bearing surface plane.

22. The method as in claim 15 wherein the third ion milling is a continuation of the second ion milling.

23. The method as in claim 15 wherein the third ion milling is a separate ion milling step from the second ion milling.

* * * * *

UNITED STATES PATENT AND TRADEMARK OFFICE
CERTIFICATE OF CORRECTION

PATENT NO. : 8,349,197 B2
APPLICATION NO. : 12/623206
DATED : January 8, 2013
INVENTOR(S) : Hong et al.

It is certified that error appears in the above-identified patent and that said Letters Patent is hereby corrected as shown below:

In the Claims:

Column 10, Claim 15, Line 39, replace "milling, tapered using the alumina" with
--milling, using the tapered alumina--

Signed and Sealed this
Twenty-third Day of April, 2013

Teresa Stanek Rea
*Acting Director of the United States Patent and Trademark Office*